(12) United States Patent
Friese

(10) Patent No.: US 6,582,669 B1
(45) Date of Patent: Jun. 24, 2003

(54) METHOD FOR PRODUCING CERAMIC POWDERS UTILIZING GAS-DISPLACING OR GAS-GENERATING ADDITIVES

(76) Inventor: Karl-Hermann Friese, Obere Burghalde 54, 70299 Leonberg (DE)

( * ) Notice: Subject to any disclaimer, the term of this patent is extended or adjusted under 35 U.S.C. 154(b) by 0 days.

(21) Appl. No.: 09/529,481
(22) PCT Filed: Jun. 15, 1999
(86) PCT No.: PCT/DE99/01739
§ 371 (c)(1),
(2), (4) Date: Jul. 5, 2000
(87) PCT Pub. No.: WO00/09461
PCT Pub. Date: Feb. 24, 2000

(30) Foreign Application Priority Data

Aug. 14, 1998 (DE) ......................... 198 36 989

(51) Int. Cl.⁷ ............................... C04B 35/00
(52) U.S. Cl. .......................................... 423/1
(58) Field of Search ................. 423/263, 608, 423/625, 592, 593, 1; 501/103, 126, 127, 134, 152, 153

(56) References Cited

U.S. PATENT DOCUMENTS

| | | | |
|---|---|---|---|
| 4,219,359 A | * | 8/1980 | Miwa et al. |
| 4,288,251 A | * | 9/1981 | Haga et al. |
| 4,294,795 A | * | 10/1981 | Haga et al. |
| 4,450,184 A | * | 5/1984 | Longo et al. |
| 4,695,439 A | | 9/1987 | Ritsko et al. |
| 5,087,592 A | * | 2/1992 | Nadkarni ................ 423/287 |
| 5,093,314 A | * | 3/1992 | Takahashi et al. |
| 5,155,071 A | * | 10/1992 | Jacobson ................ 423/608 |
| 5,681,784 A | * | 10/1997 | Friese |

FOREIGN PATENT DOCUMENTS

| | | |
|---|---|---|
| JP | 59 162130 | 9/1984 |
| JP | 59 227725 | 12/1984 |
| JP | 05 024844 | 2/1993 |
| JP | 5-229805 | * 9/1993 |
| JP | 06 183820 | 7/1994 |
| SU | 1 772 099 | 10/1992 |

OTHER PUBLICATIONS

H. Thomas, Ceramic Technology International 65–68 (1992), no month, "Properties and Applications of Electro-fused Technical Zirconia Powders".
M. Lerch, 79 J. Am Ceram. Soc 2641–2644 (1996), Oct., "Nitridation of Zirconia".
M. Lerch et al., 15 J Mat Sci Letters 2127–2129 (1996), Dec., "Kinetic and Thermodynamic Studies on the Incorporation of Nitrogen Into Zirconia".

* cited by examiner

Primary Examiner—Stanley S. Silverman
Assistant Examiner—Edward M. Johnson
(74) Attorney, Agent, or Firm—Kenyon & Kenyon

(57) ABSTRACT

A method is described for producing a ceramic powder, in which at least one ceramic base powder or ceramic slurry is subject to a heat treatment for generating an intermediate product from which the ceramic powder is produced. The ceramic base powder, the ceramic slurry, or an optionally added additive is transformed in the heat treatment such that gas components are essentially avoided in the ceramic powder or such that gases released from the ceramic base powder or from the ceramic slurry adjust a partial pressure in the ceramic powder.

22 Claims, 1 Drawing Sheet

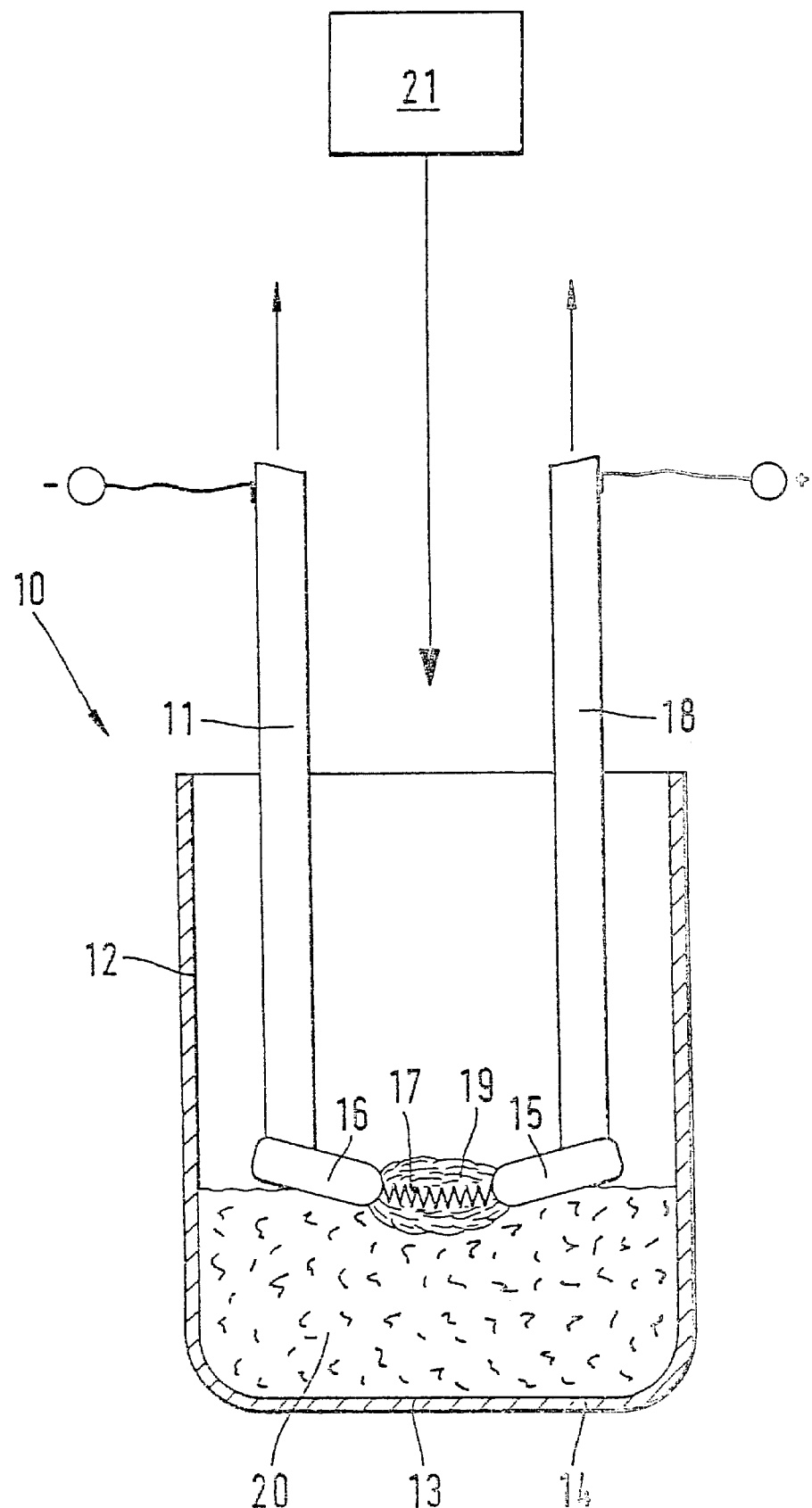

METHOD FOR PRODUCING CERAMIC POWDERS UTILIZING GAS-DISPLACING OR GAS-GENERATING ADDITIVES

FIELD OF THE INVENTION

The present invention relates to a method for producing ceramic powders.

BACKGROUND INFORMATION

Examples of general methods of this type are electric arc melting processes such as described in an article by H. Thomas, *Ceramic Technology International*, 1992, pp. 65–68. However, in response to the heat treatment, in particular, in response to the melting of ceramic powders, gas cavities and gases from the ambient environment (in particular, nitrogen from the ambient air) can be embedded in the crystal lattice of the melting stock, obtained as intermediate product, or of the ceramic body. After this intermediate product is further processed into a ceramic powder, for example, through grinding, it is possible that in the subsequent sintering of the ceramic powder a swelling of the ceramic structure can arise as a result of gas expulsion (see M. Merch, J. Am Ceram. Soc, 79, (1996), p 2641–44 and M. Merch et al., J Mat Sci Letters, 15, (1996), p. 2127–29). This problem arises, in particular, in the manufacture of planar sensor elements on a base of $ZrO_2$ stabilized by $Y_2O_3$. The ceramic powders used for this purpose are often produced in an electric arc melting process, followed by grinding and particle size fractionation, and are then sintered, after shaping. Ceramic powders are particularly suitable for planar sensor elements due to their favorable properties with respect to film casting and on the basis of their favorable sintering activity.

To avoid undesirable gas cavities or the embedding of gas atoms in the ceramic base material during melting, the melting process has previously been partially carried out in a protective atmosphere, so that, for example, a displacement of the ambient air from the base powders or from the ceramic raw ore can be achieved before and during the actual melting process. In this context, however, areas still regularly arise that have undesirably high concentrations of residual gas or gas cavities (so-called "air pockets") in powder agglomerates in the raw ore.

An alternative, familiar process, also having.t.he goal.of nitrogen expulsion, is, for example, the calcining of a solidified or broken up melting stock made of yttrium-stabilized zirconium dioxide at roughly 1600° C. in an oxidizing atmosphere, before the subsequent grinding or classifying process. This method of re-calcining ceramics in order to increase the sintered density is described by Esper and Friese (DKG conference 1972, proceedings XXIX, pp. 1–13) in the example of pure clay, which contains β-pure clay and which in turn decomposes into $Na_2O$ and $Al_2O_3$, in the process being able to expand the ceramic structure due to the vapor pressure that arises. Some disadvantages of these methods, however, are found in the great technical expense of a further calcining step and in the often insufficient subsequent displacement of the residual gases from the ceramic powder or from a corresponding intermediate product.

SUMMARY

An object of the present invention is to produce ceramic powders that result from a heat treatment of the base powders, such that existing gas cavities or gas components are to a high degree displaced from the ceramic base powder or the ceramic slurry before or during the production process. In addition, as according to the present invention adjusts in a controlled manner certain partial pressures of one or more desirable gases in the resulting ceramic powder.

In contrast to the related art, the method according to the present invention has an advantage in that it is significantly more rational and effective with respect to the completeness of the gas displacement or of the partial pressure adjustment and to the technical process control. Thus, using solid or liquid additives, which, for example, experience a significant increase in volume in response to evaporation or sublimation or thermal decomposition, a gas is largely or completely displaced from the ceramic base powder or powders or from the slurry as a base material, using a relatively small quantity of additives. Furthermore, using the additives, gases can be introduced into the ceramic powder in a controlled manner, gases that were not contained in the ceramic base materials, so that the method according to the present invention makes possible a broad palette of possibilities for modifying the resulting ceramic powder in its properties, and specifically in its sintering characteristics. This manner of proceeding makes possible, for example, a controlled adjustment of an oxygen partial pressure or the doping of a ceramic or of a ceramic powder having oxygen voids, which has great technical importance, in particular, in the area of ceramic sensor elements on the basis of oxygen-ion-conductive, yttrium-stabilized $ZrO_2$. Furthermore, through the addition of corresponding additives, the sintering activity of the resulting ceramic powder can be improved in its further processing.

A gas can be substantially displaced particularly advantageously, for example, from powder agglomerates in the raw ore or from gas cavities in a ceramic slurry, or a partial pressure can be adjusted, if the additives have been added to the base powder as grinding aids already before the actual transformation and/or are introduced, in the form of a binder system, into the ceramic slurry or the ceramic powder. In one embodiment according to the present invention, using this treatment, it is possible to achieve a pelletizing or granulizing of the base materials before the actual transformation of the additives in the course of a heat treatment of the base powders or slurry. As a result of preparatory steps of this type, the additives can be distributed very uniformly in powder agglomerates or in ceramic slurries, and the powder can be diffused sufficiently loosely, which, for example, paves the way for a rapid and adequate degasification of a powder raw ore. By adding a plurality of different additives, the possibility arises that gases such as air or nitrogen, during the transformation of the additives, can be displaced by a heat treatment of the base materials over a very broad temperature range, thus avoiding an explosion-like gas expansion. Such combinations of additives can be advantageously realized, for example, using solutions, emulsions, or suspensions, such as are known in ceramic processing technology.

In the event that use is made of a mixture of a $Y_2O_3$ base powder and a $ZrO_2$ base powder, it is possible to obtain, for example, using the method according to the present invention, a nitrogen-poor lattice structure and consequently a high sintered density of the yttrium-stabilized $ZrO_2$ ceramic produced, without a disadvantageous swelling up of the ceramic structure in response to sintering. One embodiment of the method that is technically particularly simple and advantageous results if the fine-particle-sized ceramic $ZrO_2$ and $Y_2O_3$ base powders have added to them the corresponding hydroxides before or during the heat treatment or, in the concrete case, before or during an electric arc melting, the hydroxides being then transformed into the corresponding oxides releasing water vapor, the resulting water vapor displacing the air or oxygen from the powder raw ore and, optionally, at high temperatures further decomposing into hydrogen and oxygen.

BRIEF DESCRIPTION OF THE DRAWING

The FIGURE shows a representation illustrating an electric arc melting device according to the present invention.

DETAILED DESCRIPTION

An electric arc melting device 10 depicted in the FIGURE has two electrodes 15 and 16 having electrode supply lines 11 and 18. Electrodes 15 and 16 are made, for example, of graphite and are arranged in a crucible 14 made, for example, of graphite or gray cast iron, having a crucible wall 12 and a crucible bottom 13. Between electrodes 15 and 16 an electric arc 17 forms. Above crucible 14 is located a container holding a base mixture 21, which contains a ceramic base powder or a ceramic base slurry or a mixture of these components, as well as additives. The base mixture is fed into melting zone 19. This takes place, for example, as a result of the fact that base mixture 21 is released from the container, so that it flows between electrodes 15, 16 and thus through melting zone 19. Base mixture 21, however, may also be in crucible 14 already at the beginning of the melting process. Further details, known as a matter of course to the worker skilled in the art, of electric arc melting design are not depicted in the FIGURE On bottom 13 of crucible 14, beneath melting zone 19, an intermediate product 20 arises, that, for example, is further processed in a subsequent grinding into a ceramic powder.

The technical configuration of the electric arc melting process sketched in the FIGURE in its principal design is subject to a multitude of generally known technical variants and configurations, e.g., with respect to the supplying of the ceramic base powder or slurry and of the additives into the actual melting area.

The re-filling of base mixture 21 can take place, for example, in that, from above, the ceramic base powder or slurry and the additives are resupplied as base mixture 21, so that melting zone 19 and thus the just-melted ceramic, similarly to what happens in a zone melting process, are located in the vicinity of the surface of the material situated in crucible 14, while the areas below having the generated intermediate product 20 are already slowly cooling.

The process of the electric arc melting sketched in the FIGURE, in one the present invention, can also take place without a crucible, if the ceramic base powder or slurry along with the additives are directly injected into an electric arc in air or oxygen or in a protective atmosphere, similar to the process in plasma spraying, the additives in the process being transformed in the electric arc, and the melted ceramic powder, for example, being cooled over a falling path, and being caught outside the hot zone of the electric arc. The already powder-like intermediate product obtained in this manner is then ground.

A particularly advantageous process control results, for example, in the electric arc melting process, if the gases or vapors generated by the additives are heavier than air and, as a result, are prevented from escaping from the melting crucible too soon.

In a further embodiment according to present invention, the ceramic base powders and/or the additives can also be in crucible 14 in the form of raw ore even before the actual electric arc melting process. Alternatively, it is possible that only the ceramic base powder is already in crucible 14, while the additives are introduced from outside into melting zone 21. In yet another embodiment according to the present invention, the additives are poured on crucible bottom 13 and/or are applied as a film or coating to crucible wall 12.

The method according to the present invention for producing a ceramic powder is based on one or more ceramic base powders or a ceramic slurry. The slurry, in this context, may include one or more ceramic base powders as components. To these base materials, at least one additive is subsequently added, the additives being transformed in a heat treatment of the base materials such that initially, in the intermediate product thus obtained and later in the ceramic powder produced therefrom, gas components are essentially avoided, or such that the gases released from the additive adjust, in a controlled manner, a partial pressure in the ceramic powder. In this context, the additive can be solid or liquid or in the form of a powder, solution, emulsion, or suspension for example.

The additive may include oxygen, hydrogen, carbon, a combination of oxygen and hydrogen, and/or a gas that is heavier than air and essentially free of nitrogen and halogens.

It is possible to add the additive or additives to the base materials before the heat treatment, during the grinding or mixing of the ceramic base powders or of the ceramic slurry, the additive at the same time being able to be used as binder, solvent, or softener for the ceramic base powder or the ceramic slurry. In one embodiment to the present invention, for a simpler manipulation of the base materials to which the additives have been added, it is possible that subsequently a partial or complete drying of this mixture or of this slurry takes place. This drying can, for example, be a spray-drying or a freeze-drying. The additives that are simultaneously used as binders or binder systems for the ceramic base powders may also function to granulate and/or pelletize the ceramic base powders, thus significantly simplifying their handling in the subsequent process.

A further manner of introducing the additives can be the storage of the ceramic base powders in a saturated vapor or gas atmosphere of the additive.

To improve the results from transforming the additives using the heat treatment with respect to the thoroughness with which undesirable gas components are avoided in the ceramic powder obtained as the end product, it is also possible, furthermore, before or during the transformation to carry out a rinsing using a gas or gas mixture that is not identical to the gas to be avoided or that contains it only in small concentrations. In many cases, argon or a different inert gas, for example, is suitable for this rinsing. In the event that the gas to be avoided is air or nitrogen, then other nitrogen-poor or nitrogen-free gases or gas mixtures, such as $CO_2$ may be considered.

A transformation of the additives in the heat treatment includes, for example, a thermal decomposition, a combustion, a dissociation, a melting in gas expansion, a vaporization, a sublimation, a gas desorption from the additive, or another chemical reaction, the gases being displaced from the ceramic base powders or the ceramic slurry or being replaced by other gases, or such gases being bound in a chemical reaction, or gases released or bound by the additive in the resulting ceramic powder adjusting in a controlled manner a partial pressure of a gas or a gas mixture. Ultimately, the addition of the additive leads to an intermediate product that is then, in a subsequent step, processed into a ceramic powder. This ceramic powder is then used, for example, to manufacture planar, ceramic sensor elements. One embodiment for the manufacture of a ceramic powder according to the present invention is the yttrium-stabilized $ZrO_2$ powder discussed below.

The gas components to be avoided can arise from the base materials, for example, as a result of gas cavities in the ceramic base powders or the ceramic slurry, gas intercalations in the powder raw ore of the base powder after the grinding or mixing, the ambient or present gas atmosphere before or during the heat treatment of the base powders or slurry, or the gas desorptions or gas-like reaction products before or during the heat treatment. The heat treatment for producing the intermediate product, in the method according to the present invention, can be, for example, a melting, in particular, an electric arc melting process, a sintering, or an exothermic chemical reaction. The further processing of the intermediate product, which is thereafter present, for example, as a molten mass or as a ceramic sintering body, into the ceramic powder takes place subsequently, for example, by grinding the intermediate product, optionally using a subsequent particle-size fractionation. The ceramic powder as the end product of the manufacturing process according to the present invention can then be further processed as desired, for example in a film casting.

The useful quantities of additives for avoiding gas components in the ceramic powder or for adjusting a gas partial pressure, may be determined in the individual case by the specific dimensions of the melting facility, the density or porosity of the ceramic powders or slurry, and the specific degree of avoidance of gas components for the specific material and the specific use.

Regarding the size suitable in practice for a substantial or complete avoidance of gas components in the ceramic powder, it has been established that the quantity of the transformed additive be measured such that the additives, in the heat treatment, release or take up a volume of gas that corresponds roughly to from 0.5 to 100 times the volume of the base materials in the heat treatment—in accordance with the specific degree of avoidance or displacement and of the width of the temperature range of the gas release for adjusting a gas partial pressure. In a too-small quantity of additives, it is impossible to attain a sufficient avoidance or adjustment of the gas components. In the event of significantly too-high quantities of additives, if a transformation takes place in a narrow temperature range, disadvantageous explosion-like volume increases can take place under certain circumstances.

One embodiment of the method according to the present invention provides for avoiding explosion-like transformations of this type by extending the transformation over as broad a temperature range as possible. The temperature range in which the transformation of the additive takes place depends in great measure on the choice of additive. In the case of water, the temperature range is around 100° C., but in the case of other additives, temperatures up to 1200° C. are reached. The temperature range relevant to a given case emerges for the worker skilled in the art from the chemical properties of the additives selected. This applies, in particular, to the controlled adjustment of a gas partial pressure and specifically of an oxygen partial pressure in the ceramic powder.

The parameters that the worker skilled in the art has to roughly determine for the production method according to the include, for example, the volume of melting zone 19 or the volume occupied by the base materials in the thermal reaction, the quantity of additives to be introduced or the proportion of the gas to be released from the additives.

The production method of the present invention is here explained in the example of the one electric arc melting process depicted in the FIGURE, by which a ceramic, yttrium-stabilized $ZrO_2$ powder is produced, the resulting ceramic powder containing as small a concentration as possible of nitrogen components, so that it subsequently can be used for film casting and after that can be sintered, without the ceramic structure swelling up through the expulsion of nitrogen. Accordingly, the gas component to be avoided in the transformation of the additive is in this case nitrogen, which is also contained in significant quantities in the gas atmosphere present in the electric arc melting process.

Measurements of this ceramic $ZrO_2/Y_2O_3$ powder have shown that the swelling up by nitrogen expulsion during sintering between 1400° C. and 1600° C. can lead to the fact that the value, reached first at 1400° C., of the sintered density of the ceramic structure, as a result of the nitrogen expulsion in the range of 1600° C., falls from over 90% of the maximum theoretical density of the ceramic structure to roughly 75%. Using the method according to the present invention, this falling caused by swelling was completely avoided and the sintered density rose even between 1400° C. and 1600° C. to 99%. To avoid this swelling, it was sufficient to reduce the nitrogen content in the ceramic structure of the ceramic powder by a factor of two, which in the concrete exemplary embodiment meant a nitrogen reduction from roughly 2800 ppm to roughly 1300 ppm.

Table 1 shows a selection of additives to a $ZrO_2/Y_2O_3$ powder mixture for expulsion of nitrogen from the resulting ceramic powder as well as their aggregate states, possible methods for adding the additives to the ceramic base powders or slurries according to Table 2, and possible combinations of additives. This summary is by no means complete and should be seen only as an example of the method according to the present invention.

TABLE 1

Additives to a $ZrO_2/Y_2O_3$ powder mixture

| No additives | aggregate state | method (Table 2) | possible combinations | further possible functions |
|---|---|---|---|---|
| 1 water | liquid | a,b,c,d,e | +Ar, +$CO_2$ | solvent |
| 2 $CO_2$ dry ice | solid | d,e | +all | $O_2$ partial pressure |
| 3 methanol | liquid | a,c,d,e | +2 | $O_2$ partial pressure |

TABLE 1-continued

Additives to a $ZrO_2/Y_2O_3$ powder mixture

| No | additives | aggregate state | method (Table 2) | possible combinations | further possible functions |
|---|---|---|---|---|---|
| 4 | propanol | liquid | a,c,d,e | +2, +3 | $O_2$ partial pressure |
| 5 | polyvinyl alcohol | solid | a,b | +2 | binder |
| 6 | wax (mulrax) | solid | a,b | aqueous emul. | binder |
| 7 | polyvinyl butyral | solid | a,b | +8, +9 | binder |
| 8 | butylcabitol | liquid | a,b,d,e | +7, +9 | solvent |
| 9 | polyglycol | liquid | a,b,d,e | +7, +8 | softener |
| 10 | propandiol | liquid | a,b,d,e | | grinding aid |
| 11 | terpineol | liquid | a,b,d,e | | solvent |
| 12 | Zr-butylate | liquid | a,b | | sintering activity |
| 13 | Al-stearate | solid | a,b | +14, +15 | sintering activity |
| 14 | Zr-hydroxide | solid | a | +13, +15, +16 | |
| 15 | yttrium hydroxide | solid | a | +14, +13, +16 | |
| 16 | $Al(OH)_3$, AlO (OH) | solid | a | +14, +15, +13 | sintering activity |
| 17 | alkaline earth oxides | solid | a,d | | preventing a gas from embedding in the ceramic powder |
| 18 | alkaline oxides | solid | a,d | | |

The additives can at the same time also fulfill other functions such as solvents for the ceramic slurry, as softeners, binders, grinding aids, as additions to improve the sintering activity of the ceramic powder, or as an additive to adjust a desired gas partial pressure. In particular, the adjustment of an oxygen partial pressure, in the case of the ceramic $ZrO_2/Y_2O_3$ powder, is of technical significance.

TABLE 2

Possibilities for adding the additives a.) Addition as powder or solution or emulsion or suspension during grinding or mixing of the ceramic base powder or slurry b.) Addition as solution or emulsion or suspension during grinding or mixing of the ceramic base powders or slurry and a subsequent partial or complete drying (e.g., as spray drying or freeze drying of the resulting slurry.)

c.) Storing the ceramic base powder in a preferably saturated vapor atmosphere of the additive (maturing)

d.) Injection or spraying of the additives or of a solution or emulsion or suspension of the additives into the ceramic base powder of the ceramic slurry e.) Pouring the additives onto crucible floor 13 or applying them as a film or coating on crucible wall 12 in the context of an electric arc melting device 10

When water is used, its dissociation into hydrogen and oxygen, inter alia, is exploited at high temperatures. Dry ice at high temperatures reacts so as to yield carbon monoxide and oxygen. In the electric arc melting process, Zr-butylate forms $ZrO_2$. Al-stearate in the electric arc melting process forms $Al_2O_3$, which particularly aids the sintering activity of the resulting $ZrO_2/Y_2O_3$ powder. Zirconium hydroxide and yttrium hydroxide as additives make possible a production method that is technically particularly simple and economical, since they react above roughly 400° C. yielding $ZrO_2$ and $Y_2O_3$ and water vapor, which subsequently dissociates and thus avoids gas components in the ceramic powder. Accordingly, it is possible to realize the addition of the yttrium oxide necessary to stabilize the $ZrO_2$ (as a rule roughly 8% by weight) either partially or completely through mixing a ceramic $ZrO_2$ base powder with an yttrium hydroxide as additive, which has the particular advantage that no undesirable residues of the additive remain in the ceramic powder. Alternatively or in addition, it is possible, advantageously for avoiding too great quantities of gas, to introduce one portion, roughly 50 mol. %, of the ceramic $ZrO_2$ base powder via zirconium hydroxide as an additive and the yttrium oxide via yttrium hydroxide as an additive or as an yttrium oxide base powder. The addition of small quantities (up to 5% per weight) of aluminum hydroxide ($Al(OH)_3$ or AlOOH) also releases water or water vapor and forms $Al_2O_3$, which aids in the sintering activity of the ceramic powder. The addition of the aforementioned hydroxide is possible in practice simply by mixing the ceramic base powder with the additives or by incorporating it in a ceramic slurry. In addition, the hydroxides are inexpensive and avoid a too powerful, explosion-like gas expansion. Similar advantages also attach to further additives according to the present invention, which after their transformation as oxides remain in the ceramic powder.

In another embodiment according to the present invention, zirconium hydroxide and/or yttrium hydroxide and/or small quantities of aluminum hydroxide (up to 5% per weight), used in the form of a mixture as a ceramic base powder or in the form of a solution as slurry, are transformed in the course of a heat treatment, water and water vapor being released in the process. In this case, it is possible to do without adding an additive, since the gas-producing or gas-displacing components are already released from the ceramic base materials during the transformation.

What is claimed is:

1. A method for producing a ceramic powder, comprising the steps of:
    adding at least one additive to a ceramic base mixture, the mixture including one of a ceramic slurry and at least one ceramic base powder;
    rinsing the base mixture, before or during the heat treating, using one of a gas essentially free of nitrogen, a gas mixture essentially free of nitrogen, a nitrogen-free gas and a nitrogen-free mixture;

heat treating the base mixture, wherein the base mixture is transformed into an intermediate product such that at least one result occurs selected from the group of results consisting of (A) gas components are substantially avoided in the intermediate product and (B) gases released by the at least one additive adjust a partial pressure in the intermediate product; and processing the intermediate product to form the ceramic powder.

2. The method according to claim 1, wherein the heat treating includes an electric arc melting process, the base mixture being melted in an electric arc during the heat treating.

3. The method according to claim 1, wherein the heat treating transforms the base mixture by at least one of decomposition, vaporization, sublimation, and a chemical reaction, the transformation causing gas to be released.

4. The method according to claim 1, wherein, before the heat treating, the ceramic base mixture is stored in a saturated vapor atmosphere of the at least one additive.

5. The method according to claim 1, wherein the addition of the at least one additive takes place during one of a grinding and a mixing of the ceramic base mixture.

6. The method according to claim 1, further comprising the step of, after adding the at least one additive to the ceramic base mixture, one of partially and completely drying the base mixture by one of spray-drying and freeze-drying.

7. The method according to claim 1, wherein the ceramic base mixture includes at least one of $ZrO_2$, $Y_2O_3$, and a mixture of $ZrO_2$ and $Y_2O_3$.

8. The method according to claim 1, wherein the ceramic base mixture includes one of zirconium hydroxide, yttrium hydroxide, aluminum hydroxide, zirconium dioxide, yttrium oxide, and a mixture of at least two of these components.

9. The method according to claim 1, wherein the at least one additive includes one of a binder, a solvent, and a softener for the ceramic base mixture.

10. The method according to claim 1, wherein the additive includes at least one of oxygen, hydrogen, carbon, a combination of oxygen and hydrogen, and a gas that is heavier than air and essentially free of nitrogen and halogens.

11. The method according to claim 1, wherein during the heat treating, the at least one additive forms one of $ZrO_2$, $Y_2O_3$, oxides, and a combination of at least two of these materials.

12. The method according to claim 11, wherein the at least one additive forms at least $Al_2O_3$.

13. The method according to claim 1, wherein the additive aids a sintering activity of the ceramic powder.

14. The method according to claim 1, wherein the at least one additive is a grinding aid for the ceramic base mixture.

15. The method according to claim 1, wherein the at least one additive includes a binder for at least one of granulation and pelletization of the ceramic base mixture.

16. The method according to claim 1, wherein the additive includes one of water, $CO_2$ dry ice, methanol, propanol, polyvinyl alcohol, wax, polyvinyl butyral, butylcarbitol, polyglycol, propandiol, terpineol, zirconium butylate, aluminum stearate, zirconium hydroxide, yttrium hydroxide, aluminum hydroxide, alkali earth oxides, and alkaline earth oxides.

17. The method according to claim 1, wherein the at least one additive adjusts an oxygen partial pressure in at least one of the intermediate product and the ceramic powder.

18. The method according to claim 1, wherein, during the heat treating, the at least one additive one of occupies and releases a volume of gas in a range of between 0.5 and 100 times a volume of the base mixture.

19. The method according to claim 1, wherein the processing step includes grinding the intermediate product to form the ceramic powder.

20. The method according to claim 19, further comprising the step of, after the processing step, particle-size fractioning the ceramic powder.

21. The method according to claim 1, wherein the step of rinsing includes rinsing with argon.

22. A method for manufacturing a planar, ceramic sensor element, comprising the steps of:

adding at least one additive to a ceramic base mixture, the mixture including one of a ceramic slurry and at least one ceramic base powder;

rinsing the base mixture, before or during the heat treating, using one of a gas essentially free of nitrogen, a gas mixture essentially free of nitrogen, a nitrogen-free gas and a nitrogen-free mixture;

heat treating the base mixture, wherein the base mixture is transformed into an intermediate product such that at least one of the following results occurs selected from the group of results consisting of (A) gas components are essentially avoided in the intermediate product and (B) gases released by the at least one additive adjust a partial pressure in the intermediate product; and constructing the planar, ceramic sensor element with the intermediate product.

* * * * *

UNITED STATES PATENT AND TRADEMARK OFFICE
CERTIFICATE OF CORRECTION

PATENT NO.      : 6,582,669 B1
DATED           : June 24, 2003
INVENTOR(S)     : Karl-Hermann Friese It is certified that error appears in the above-identified patent and that said Letters Patent is hereby corrected as shown below:

<u>Title page,</u>
Insert item:
-- [73] Assignee: Robert Bosch GmbH, Stuttgart (DE) --

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,582,669 B1
DATED : June 24, 2003
INVENTOR(S) : Karl-Hermann Friese It is certified that error appears in the above-identified patent and that said Letters Patent is hereby corrected as shown below:

Column 2,
Line 4, change "as according" to -- a method according --

Column 3,
Line 51, change "in one the present" to -- in one embodiment according to the present --

Column 4,
Line 32, change "embodiment to" to -- embodiment according to --

Column 5,
Line 26, change "example" to -- example, --

Column 6,
Line 14, change "the include" to -- the present invention include --

Signed and Sealed this

Third Day of May, 2005

JON W. DUDAS
*Director of the United States Patent and Trademark Office*